United States Patent

Mueck et al.

(10) Patent No.: US 9,591,617 B2
(45) Date of Patent: Mar. 7, 2017

(54) COMMUNICATION CONTROLLER AND METHOD FOR TRANSMITTING DATA

(71) Applicant: INTEL DEUTSCHLAND GMBH, Neubiberg (DE)

(72) Inventors: Markus Dominik Mueck, Unterhaching (DE); Nikos Koutsouris, Piraeus (GR); Panagiotis Demestichas, Piraeus (GR)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 802 days.

(21) Appl. No.: 13/792,595

(22) Filed: Mar. 11, 2013

(65) Prior Publication Data

US 2014/0254498 A1 Sep. 11, 2014

(51) Int. Cl.
| | |
|---|---|
| *H04L 12/28* | (2006.01) |
| *H04W 72/02* | (2009.01) |
| *H04W 36/00* | (2009.01) |
| *H04J 1/16* | (2006.01) |
| *H04W 48/18* | (2009.01) |

(52) U.S. Cl.
CPC ....... *H04W 72/02* (2013.01); *H04W 36/0022* (2013.01); *H04W 36/0027* (2013.01); *H04W 48/18* (2013.01)

(58) Field of Classification Search
USPC ................. 370/230, 252, 329, 389
See application file for complete search history.

(56) References Cited

U.S. PATENT DOCUMENTS

| | | | |
|---|---|---|---|
| 8,942,104 B2 * | 1/2015 | Jazra | .................... H04L 12/4633 370/237 |
| 2005/0025188 A1 * | 2/2005 | Numakura | .............. H04L 69/14 370/490 |
| 2009/0141683 A1 | 6/2009 | Grinshpun | |
| 2009/0222591 A1 | 9/2009 | Yang | |

(Continued)

FOREIGN PATENT DOCUMENTS

| | | |
|---|---|---|
| EP | 2393324 A2 | 12/2011 |
| WO | 2007024887 A2 | 3/2007 |
| WO | 2011056046 A2 | 5/2011 |

OTHER PUBLICATIONS

International Search Report and Written Opinion in related PCT Patent Application No. PCT/EP2014/051623, mailed Jul. 4, 2014, 12 pages.

(Continued)

*Primary Examiner* — John Pezzlo
(74) *Attorney, Agent, or Firm* — Schwabe, Williamson & Wyatt, P.C.

(57) ABSTRACT

A communication controller is described comprising a determiner configured to determine, for each communication connection of a set of communication connections between a communication device and another communication device, a characteristic of the communication connection, a selector configured to select a plurality of the communication connections based on the characteristics of the communication connections and a controller configured to control a transmission of data between the communication device and the other communication device to use the selected plurality of communication connections.

21 Claims, 12 Drawing Sheets

(56) References Cited

U.S. PATENT DOCUMENTS

| | | | | |
|---|---|---|---|---|
| 2012/0275323 A1* | 11/2012 | Reznik | .................... | H04L 47/10 370/252 |
| 2014/0010221 A1* | 1/2014 | Panian | .................. | H04W 76/02 370/338 |
| 2014/0198637 A1* | 7/2014 | Shan | ................... | H04W 52/243 370/229 |

OTHER PUBLICATIONS

"Multipath Routing", http://en.wikipedia.org/wiki/Multipath_routing, pp. 1-3.
"Linear Network Coding", http://en.wikipedia.org/wiki/Network_coding, pp. 1-4.
Ranveer Chandra et al. "Multinet: Connecting to Multiple IEEE 802.11 Networks—Using a Single Radio" pp. 1-13.
Markus Mueck, "Self-Growing/Opportunistic Networks Proof-of-Concept Handbook", Jun. 22, 2012, pp. 1-27.
3GPP TS 23.261 V10.2.0, 3rd Generation Partnership Project; Technical Specification Group Services and System Aspects; IP flow mobility and seamless Wireless Local Area Network (WLAN) offload; Stage 2 (Release 10), Mar. 2012, pp. 1-22.
Wei Song et al. "Performance Analysis of Probabilistic Multipath Transmission of Video Streaming Traffic over Multi-Radio Wireless Devices", IEEE Transactions on Wireless Communications, pp. 1-11.
Wei Song et al., "Performance Analysis of Probabilistic Multipath Transmission of Video Streaming Traffic over Multi-Radio Wireless Devices;" IEEE Transactions on Wireless Communications; Apr. 2012; 11 pages.
Wikipedia; "Linear Network Coding," Feb. 4, 2013; 4 pages.
Wikipedia; "Multipath Routing," Aug. 24, 2012; 3 pages.
Ranveer Chandra, et al.; "MultiNet: Connecting to Multiple IEEE 802.11 Networks Using a Single Wireless Card," Proceedings of IEEE Infocom 2004, Cornell University, Ithaca, NY; Mar. 7-11, 2004; 25 pages.

* cited by examiner

COMMUNICATION CONTROLLER AND METHOD FOR TRANSMITTING DATA

TECHNICAL FIELD

The present disclosure relates to communication controllers and methods for transmitting data.

BACKGROUND

Future mobile communication terminals such as smartphones can be expected to be able to operate communication links according to different radio access technologies (RATs) at the same time, e.g. a communication link based on WiFi in parallel to a communication link based on LTE. Efficient approaches to make use of such parallel communication links are desirable.

SUMMARY

A communication controller is provided including a determiner configured to determine, for each communication connection of a set of communication connections between a communication device and another communication device, a characteristic of the communication connection, a selector configured to select a plurality of the communication connections based on the characteristics of the communication connections and a controller configured to control a transmission of data between the communication device and the other communication device to use the selected plurality of communication connections.

Further, a method for transmitting data according to the above communication controller is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

Figure 1:
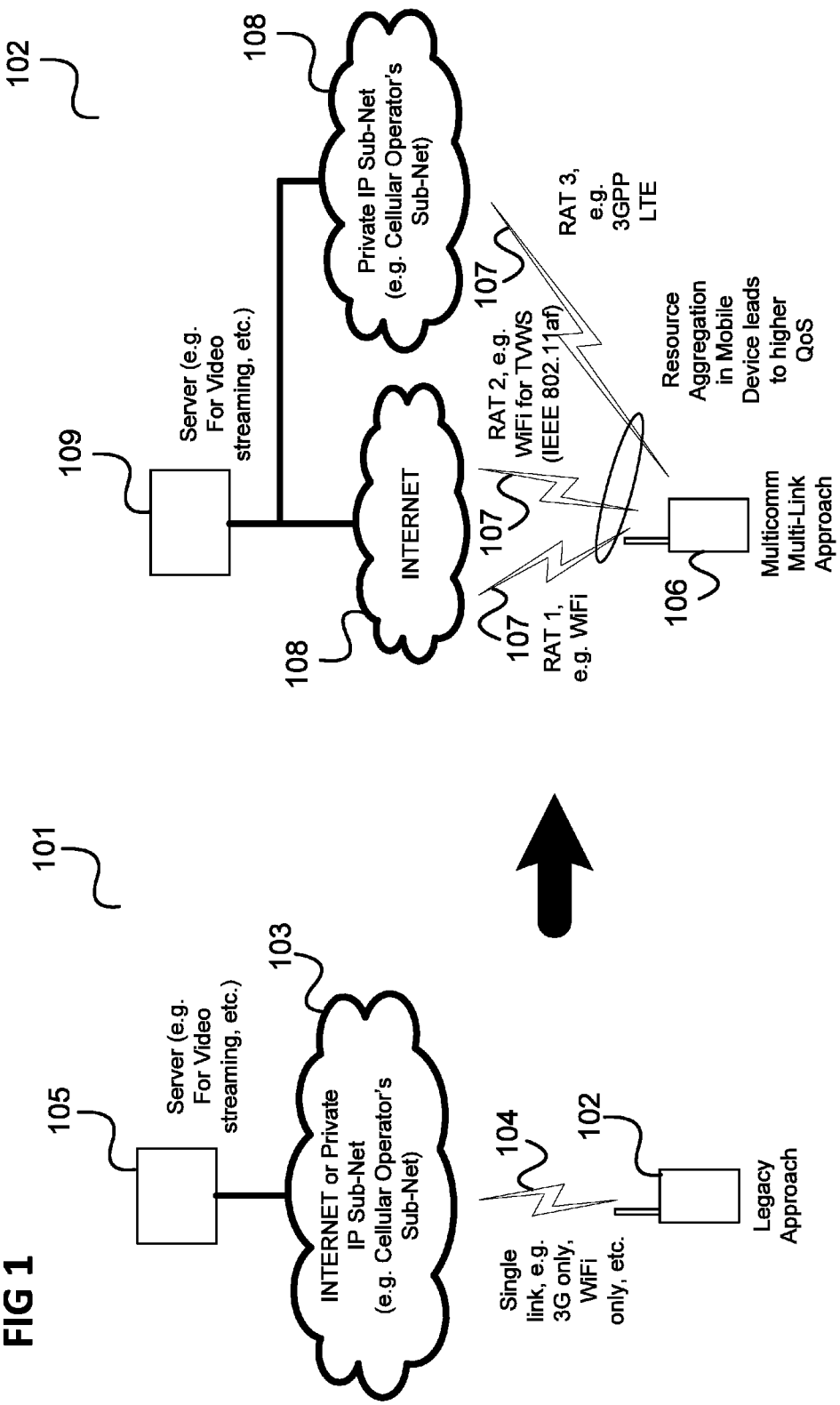
FIG. 1 shows communication systems.

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

It can be expected that future mobile devices (e.g. mobile terminals such as smartphones) will operate a multitude of heterogeneous Radio Access Technologies (RATs) simultaneously, such as WiFi, 3GPP LTE (3rd Generation Partnership Project Long Term Evolution), TV White Space Communication (IEEE 802.11af), Bluetooth, Digital Radio, GPS (Global Positioning System), etc. In order to obtain the best Quality of Service (QoS) possible for the user of a mobile device, it can be expected that a mobile device may jointly and simultaneously use a number of distinct heterogeneous RATs, which leads to an aggregation of all radio resources available to a user.

In the present description, a radio access technology may for example refer to any one of the following: A cellular wide area radio communication technology (which may include e.g. a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G)

(Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)).

The simultaneous usage of multiple routes in a network is referred to as multipath routing. The efficient exploitation of multiple routes by applying a coding scheme tailored to the presence of multiple routes is referred to as network coding. These approaches typically apply to fixed, cabled networks.

Simultaneous usage of multiple links in a wireless mobile device may for example be applied in the following contexts:

Simultaneous operation of two independent services, e.g. a voice call is operated via 3GPP UMTS (Universal Mobile Telecommunications System) while a Bluetooth connection is active to a Bluetooth headset ensuring a wireless link to the mobile device;

Simultaneous operation of two distinct RATs for Vertical Handover, e.g. 2G (second generation) and HS×PA (Highspeed Uplink/Downlink Packet Access) are operated simultaneously during a handover phase from 2G to HS×PA in order to ensure service continuity for the mobile device user.

IFOM (IP Flow Mobility): Simultaneous connection via WLAN (Wireless Local Area Network) and 3G (Third Generation) and switching IP (Internet Protocol) flows between these two RATs. This for example involves Seamless mobility of IP flows between 3G and WLAN by using Mobile IP (DSMIPv6)

Network support to find a usable non-3GPP access network (e.g. providing Discovery Information), e.g. based on parameters such as Network-IDs (SSID, TAC, . . . ), Location of AP (Access Point), Coverage-Radius, . . . .

Operator controlled RAT preferences (ISRP), e.g. to determine which of currently connected access networks should be used for a certain service/IP flow, e.g. based on IP-Address and port number or based on selected Service (APN)

3GPP technologies such as IFOM provide a technological basis for the specific case of maintaining WiFi and 3GPP simultaneously and for managing corresponding handovers.

Further, it may for example be supported that a number of heterogeneous RATs are jointly used for accessing a single service, such as video streaming, etc. The principle is illustrated in FIG. 1.

FIG. 1 shows communication systems 101, 102.

In the first communication system 101, which may be seen as the conventional or legacy approach, a mobile device access an IP network (such as the Internet or a private IP sub-net) 103 via a single radio link 104 and requests and receives data from a server 105 connected to the IP network 103.

In the second communication system 102, which may be seen as a multicomm multi-link or multi-RAT approach, a mobile device 106 has a plurality of radio links 107 to a plurality of IP networks 108 and requests and receives data from a server 109 jointly via the radio links 107. The radio links 107 for example correspond to different communication connections, e.g. different IP connections.

A challenge for a multicomm multi-link multi-RAT approach may be seen in how to efficiently split data transmission of a single service (e.g. video streaming) over a multitude of RATs being operated simultaneously. This may for example involve techniques for:

Efficiently selecting the RAT combination at the time upon demand, e.g., at the connection set-up and splitting the decision making process over network/target and mobile device entities.

Efficiently triggering/performing a multi-RAT handover in case that the context of the mobile device 106 changes (e.g. the mobile device moves and loses coverage of WiFi or similar) and splitting the decision making process over network/server and mobile device entities.

A communication controller 200 that may be used to provide a multicomm multi-link/multi-RAT communication is described in the following with reference to FIG. 2.

Figure 2:
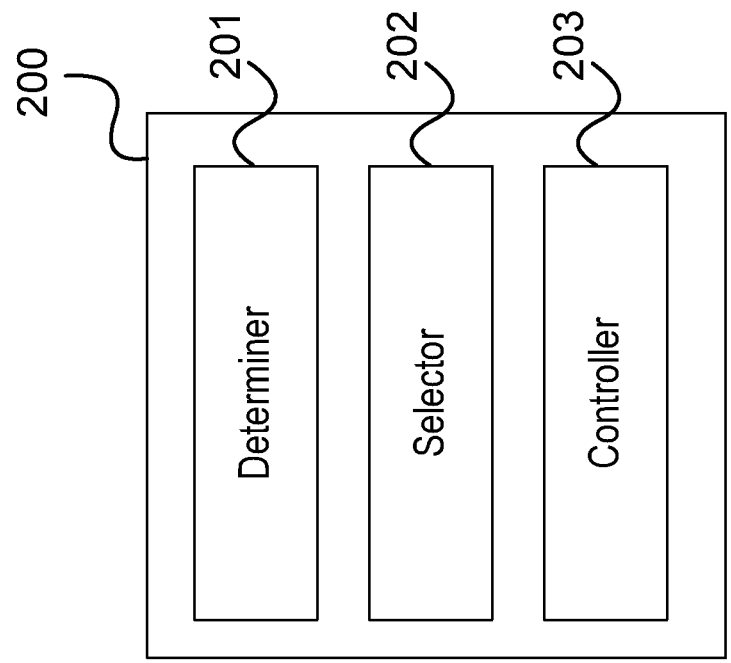
FIG. 2 shows a communication controller.

FIG. 2 shows a communication controller 200.

The communication controller 200 includes a determiner 201 configured to determine, for each communication connection of a set of communication connections between a communication device and another communication device, a characteristic of the communication connection.

The communication controller 200 further includes a selector 202 configured to select a plurality of the communication connections (i.e. two or more communication connections) based on the characteristics of the communication connections.

Further, the communication controller 200 includes a controller (e.g. a signaling circuit or a processing circuit) 203 configured to control a transmission of data between the communication device and the other communication device to use the selected plurality of communication connections.

In other words, a communication controller (which may be located on the terminal side or to the network side) selects a plurality of communication connections to be used (e.g. for a multicomm multi-link/multi RAT approach) based on characteristics of the communication connections. Using the selected plurality of communication connections may be understood as using all of the communciation connection of the plurality of communication connections for data transportation, e.g. over each of the communication connections, a part of the data to be transmitted in the data communication is transmitted. For example, this may mean that the communication connections are not merely active but are used for actual data transmission.

For example, in contrast to a multi-link solution such as IP Flow Mobility (IFOM) in 3GPP or a fixed split of a single video transmission over two different RATs the communication controller considers how to efficiently split a single service over a multitude of simultaneously operated wireless links, e.g. combined with a dynamic adaptation of the selected technologies. The approach in context with FIG. 2 can thus for example be used on top of IFOM.

The determination and selection may for example be done based on information by the user of the communication terminal. A user of a communication terminal may for example provide A set of IP addresses to be used simultaneously for the provision of at least one service. For example, a user can provide a number of IP addresses among which the network (SRV) side selects the most appropriate ones for the multi-RAT provision of a concerned service.

A list of ports which may be used in order to differentiate between the various streams that need to be finally aggregated to a single service in the target device (i.e. the communication terminal).

Policies indicating preferred usage of specific RATs and the preferred combination of RATs being operated simultaneously.

Mobility context information which may be exploited for efficient RAT selection, e.g. in case of a high mobility scenario no short range RAT (such as Bluetooth, WLAN, etc.) is used but rather a wide area RAT (such as 3G, etc.).

For each communication connection of the set of communication connections, the characteristic is for example a priority of the communication connection.

For each communication connection of the set of communication connections, the characteristic is for example based on at least one of a transmission quality via the communication connection, a bandwidth of the communication connection, a reliability of the communication connection and a cost of data transmission via the communication connection.

The communication controller may further include a transmitter configured to transmit an indication of the selected communication connections to the communication device, the other communication device or both. The transmitter may for example be the transmitter of a communication device of which the communication controller is part.

The communication controller may be part of the communication device, of the other communication device or of a separate device (e.g. network component).

The communication device is for example a communication terminal and the other communication device is for example a component of the network side of a communication system (e.g. a server).

For example, the communication device is a subscriber terminal of a cellular radio communication network.

For example, the other communication device is a network component of a cellular radio communication network.

For example, a network component provides a connection selection policy (i.e. rules to be considered for the decision making, i.e. the selection) and the mobile terminal (i.e. the communication terminal), including the communication controller in this example, selects the connections to be used subject to the policy, e.g. with the objective to maximize its own objectives. In this case, for example, the server side delivers the stream on the RATs imposed by the mobile device.

As another example, the communication terminal may communicate preferences (priorities) for the communication connections and the network side (or server side), comprising the communication controller in this example, for example decides based on these preferences.

In a communication arrangement comprising a mobile device, a network (infrastructure) component and a service server (which can be part of the network infrastructure but can also be an independent server such as a Youtube server, etc.), the communication controller selecting the communication connections may for example be located in the mobile device and select the communication connections subject to a network (and possibly server) policy, in the network component (and possibly select the communication connections subject to mobile device priorities and/or server priorities and/or a server policy) or on the server side and select the communication connections subject to mobile device priorities and/or a network policy.

It should be noted that the terminal may decide (i.e. the communication controller may be part of the communication terminal) also in case that the communication connections are provided (at least partially) by multiple operators. If the decision is performed on the network side, it may be desirable that all communication connections are offered by the same operator, which may be restrictive. For performing the decision on the (content) server side the server needs to know, e.g., IPs, ports, the network status, policies and various other things which might be wished to be kept confidential between the operator and the client device (i.e. the mobile terminal).

The communication controller may for example include a receiver configured to receive, for each communication connection, an indication of the characteristic of the communication connection.

The communication connections are for example network layer connections.

For example, the communication connections are IP connections.

The transmission of data is for example transmission of a file.

For example, the controller is configured to initiate splitting of the file in a part for each communication connection of the selected communication connections and control the transmission to transmit the part over the communication connection.

The controller is for example configured to initiate the splitting of the file at the network layer.

The communication connections of the set of communication connections are for example based on different radio access technologies.

In other words, the communication controller may select from various radio technologies like WiFi, WiFi for TVWS (IEEE 802.11af), etc. The communication controller may further include a receiver configured to receive an indication of the set of communication connections.

The components of the communication controller (e.g. the determiner, the selector and the controller and the controller) as well as the various entities described below may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

Figure 3:
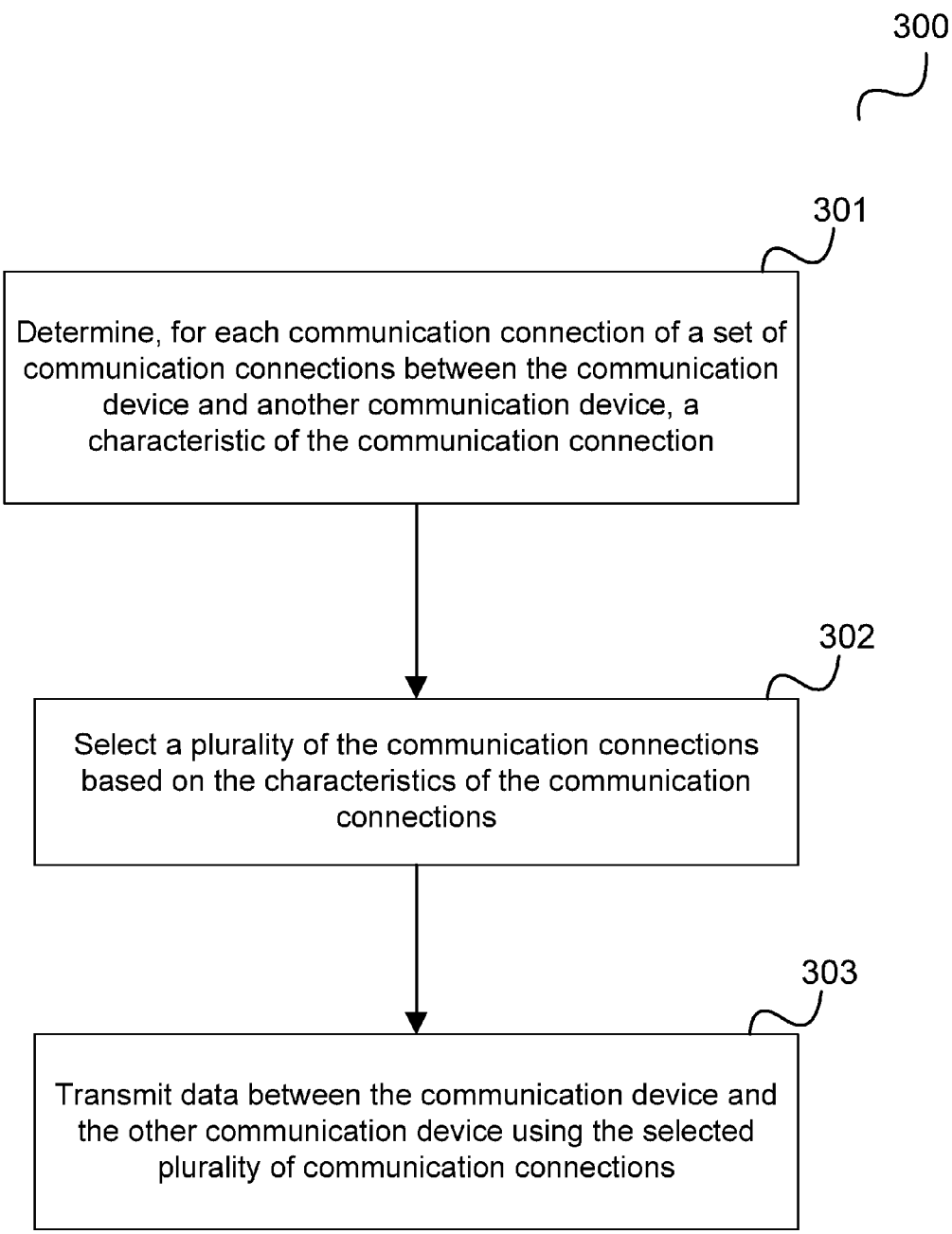
FIG. 3 shows a flow diagram illustrating a method for transmitting data.

The communication controller 200 for example carries out a method as illustrated in FIG. 3.

FIG. 3 shows a flow diagram 300.

The flow diagram 300 illustrates a method for transmitting data, for example carried out by a communication controller.

In 301, the communication controller determines, for each communication connection of a set of communication connections between a communication device and another communication device, a characteristic of the communication connection.

In 302, the communication controller selects a plurality of the communication connections based on the characteristics of the communication connections.

In 303 the communication controller controls a data transmission between the communication device and the other communication device to use the selected plurality of communication connections.

It should be noted that examples given in context of the communication controller 200 are analogously valid for the method illustrated in FIG. 3 and vice versa.

The examples described in the following may provide the following in context of the multicomm multi-link or multi-RAT approach as illustrated by the second communication system 102.

- A guided mobile device centric decision making entity for multi-RAT connection set-up and multi-RAT Handover.
- A server centric decision making entity for multi-RAT connection set-up and multi-RAT Handover.
- Approaches to let the client (i.e. the mobile device) learn about the available pieces that are transmitted by a multitude of RATs, which ports to use etc.
- An approach to handle private IP sub-nets as they are often used by cellular operators, i.e. mobile devices usually do not have a public IP address but only IP addresses of a private IP sub-net.

In the following, examples for a multicomm multi-link or multi-RAT as illustrated by the second communication system 102 are described.

The decision making mechanisms for the efficient selection of the multi-RAT radio links 107 to be operated simultaneously can for example be either done within the concerned mobile device 106 or in the server 109 or another network component providing the concerned service (e.g. video streaming) These approaches are described in the following.

Mobile Device Centric Decision Making for Selected a Multitude of Heterogeneous RATs to be Operated Simultaneously for Accessing a Single Service In the case of mobile device centric decision making, a multi-link management entity is for example introduced on the network/server side which serves for interactions with the concerned mobile device 106. This is illustrated in FIG. 4.

Figure 4:
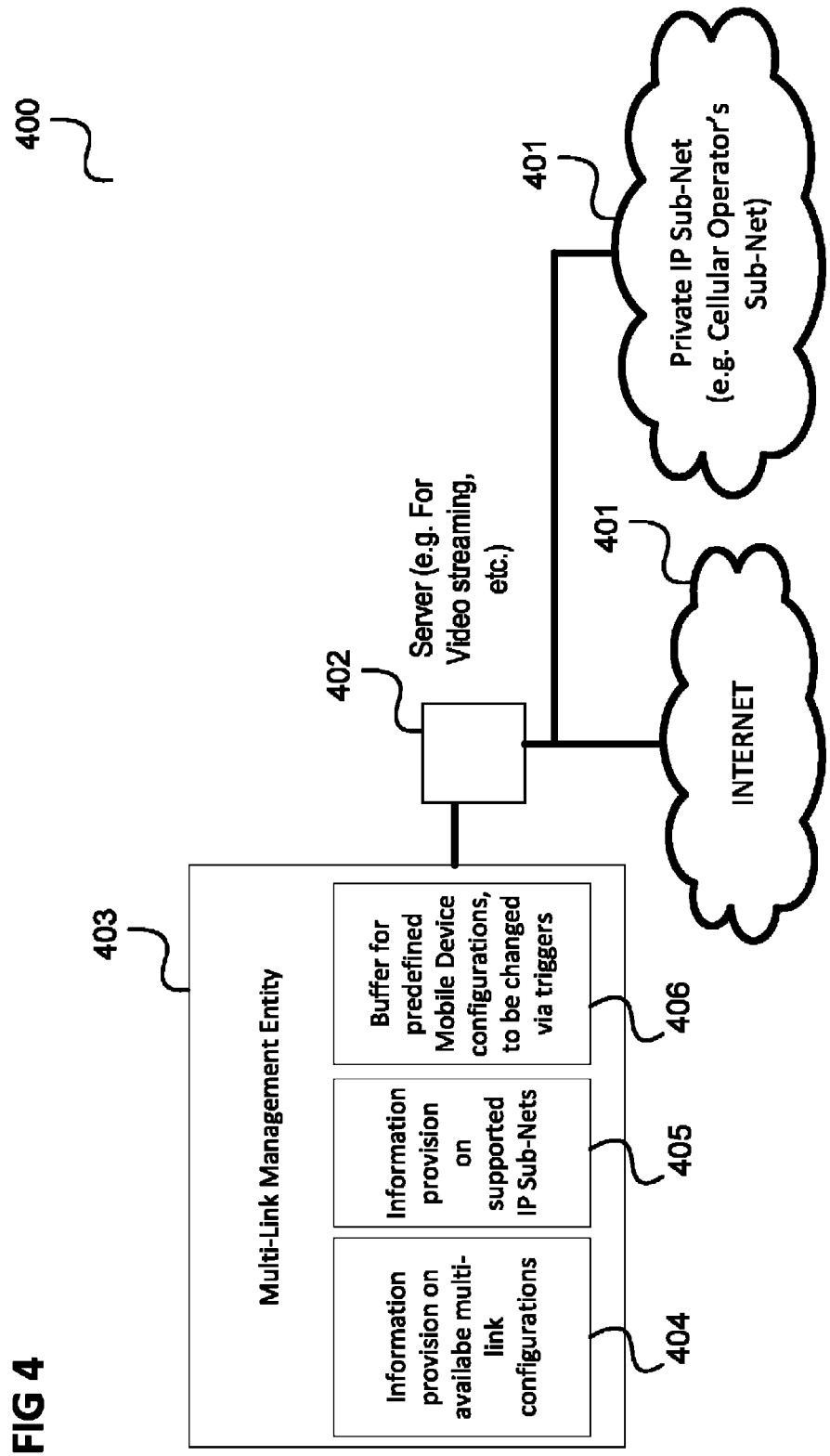
FIG. 4 shows a communication arrangement including a multi-link management entity.

FIG. 4 shows a communication arrangement 400.

The communication arrangement 400 includes IP networks 401 for example corresponding to the IP networks 108, a server 402 for example corresponding to the server 109 and a multi-link management entity 403.

The multi-link management entity 403 provides a first sub-entity 404 for information provision on available multi-link configurations, a second sub-entity 402 for information provision on supported IP sub-nets and a third sub-entity 403 for buffering predefined mobile device configurations, e.g. to be changed via triggers.

The exclusion of a configuration can also be enforced for cost reasons. The notion of cost is dynamic, for example if the user pays a monthly subscription for sending and receiving a fixed amount of data and while there are only two days remaining he has not used the service at all, the cost will be considered almost zero.

The interactions of the mobile device 106 with the multi-RAT management entity 103 and the functionalities of the sub-entities 404, 405, 406 are described in the following.

Sub-entity 404 for Information provision on available multi-link configurations: For example, for using a service via multiple radio links 107 (or more generally multiple communication links) the mobile device 106 initially contacts the first sub-entity 404 for Information provision on available multi-link configurations. The first sub-entity 404 for example gives (e.g. technology-independent) information on the available multi-link configurations possible. The first sub-entity 404 for example feeds back information to the mobile device 106 indicating how many independent links can be operated for the concerned service. Also, information on the related user experience is for example given in case that the QoS (Quality of Service) of one of the links 107 is degraded.

For example, the mobile device 106 requests a video streaming service. The video service is able to provide i) the full video stream over a single communication link, ii) a base video stream including audio over one communication link and an incremental redundancy stream over a second communication link and iii) the base video stream over one communication link, an incremental redundancy stream over a second communication link and audio over a third communication link. In such a case, the first sub-entity 404 for example provides the information as shown in table 1a about the possible communication links.

TABLE 1a

Information provided by the sub-entity for information provision on available multi-link configurations

| | |
|---|---|
| Configuration 1: One single communication link | All video and audio data is transported over a single link. If the link fails, the video/audio stream stops. |
| Configuration 2: Two communication links operated simultaneously | Video (base stream) and audio data is transported over one link, incremental redundancy video data is transported over a second link. If the second link breaks, the user suffers a reduction in QoS, but the Video is not interrupted. If the first link fails, the video/audio stream stops. |
| Configuration 3: Three communication links operated simultaneously | Video (base stream) is transported over one link, incremental redundancy Video data is transported over a second link and audio data is transported over a third link. |

This information may be used by the mobile device 106 in order to efficiently split the video stream over available radio access technologies. In the example of "configuration 2" in table 2, the mobile device 106 for example uses a robust link for the video (base stream) and the audio data, such as a 3GPP LTE radio link or similar. The incremental redundancy stream may be transported via a high-throughput but less reliable communication link, e.g. a WLAN radio link. In case that the WLAN link breaks, the user will still be able to enjoy the video/audio stream, however at a lower QoS.

Another example is the following: The mobile device 106 starts a Web Browsing service. Usually there is a setting in the device's browser that disables the automatic download of images and other bandwidth consuming objects ("heavy" objects) in the web page, not only for speeding up the browsing process, but for cost reasons as well. Instead of this, the web browsing service is able to provide i) The full web page data through a single link, with or without the "heavy" objects ii) The pure text of the web page is transported on one link and any contained "heavy" objects are transported over a second link and iii) The pure text of the web page is transported on one link, any contained "heavy" objects with size up to a predefined threshold are transported over a second link and any contained "heavy" objects with size above the predefined threshold are transported over a third link. In such a case, the information provided by the first sub-entity 404 is for example as indicated in table 1b.

TABLE 1b

Information provided by the sub-entity for information provision on available multi-link configurations

| | |
|---|---|
| Configuration 1: One single link | All web page data is transported over a single link. If the link fails, the web browsing stops. |
| Configuration 2: Two links operated simultaneously | The pure text of the web page is transported over one link, any contained "heavy" objects are transported over a second link. If the second link breaks, the User suffers a reduction in his experience, but the browsing service is not interrupted. If the first link fails, the web browsing stops. |
| Configuration 3: Three links operated simultaneously | The pure text of the web page is transported over one link, any contained "heavy" objects with size up to a predefined threshold are transported over a second link, any contained "heavy" objects with size above the predefined threshold are transported over a third link. |

Again, this information may be used by the concerned mobile device 106 in order to efficiently receive the various files over available Radio Access Technologies. In the example of "Configuration 2", the mobile device uses a very robust link for the core web page data, such as 3GPP LTE or similar. The images, flash animations or any other bandwidth consuming objects that are also part of the web page may be transported via a high-throughput but less reliable link, e.g. WLAN. In case that the WLAN link breaks, the User will still be able to continue browsing, however at a lower level of experience, due to the missing data or the need to explicitly request it over the first link.

A third example is the following: The mobile device 106 is running in the background a service like an e-mail client, a service that does not require real time communication or immediate user interaction. The service is able to provide i) The full data through a single link ii) The headers and the pure text body of the e-mails are transported on one link and any attached files are transported over a second link and iii) The headers and the pure text body of the e-mails are transported on one link, any attached files with size up to a predefined threshold are transported over a second link and any attached files with size above the predefined threshold are transported over a third link. In such a case, the information provided by the first sub-entity 404 is for example as indicated in table 1c.

TABLE 1c

Information provided by the sub-entity for information provision on available multi-link configurations

| | |
|---|---|
| Configuration 1: One single link | All e-mail data is transported over a single link. If the link fails, the e-mail download stops. |
| Configuration 2: Two links operated simultaneously | The headers and the pure text body of the e-mails are transported over one link, any attached files are transported over a second link. If the second link breaks, the User suffers a reduction in his experience, but |

TABLE 1c-continued

Information provided by the sub-entity for information provision on available multi-link configurations

| | |
|---|---|
| | the e-mail service is not interrupted. If the first link fails, the e-mail download stops. |
| Configuration 3: Three links operated simultaneously | The headers and the pure text body of the e-mails are transported over one link, any attached files with size up to a predefined threshold are transported over a second link, any attached files with size above the predefined threshold are transported over a third link. |

Again, this information may be used by the concerned mobile device 106 in order to efficiently receive the various files over available Radio Access Technologies. In the example of "Configuration 2", the mobile device 106 uses a very robust link for the body of the e-mail data, such as 3GPP LTE or similar. The attachments may be transported via a high-throughput but less reliable link, e.g. WLAN. In case that the WLAN link breaks, the User will still be able to be informed about his e-mails, however at a lower level of experience, since he will not be able to access any attachments.

For an efficient communication of the information of table 1 from the multi-management link entity 403 to the mobile device 106 (i.e. with low-signaling overhead) the multi-management link entity 403 may for example only send link priorities to the mobile device 106. For example, the priorities as given in table 2 are provided.

TABLE 2

Efficient encoding of information provided by the first sub-entity 404

| | |
|---|---|
| Configuration 1: One single communication link | Link Priority: 1 Comment: All video and audio data is transported over a single link. If the link fails, the video/audio stream stops. |
| Configuration 2: Two communication links operated simultaneously | Link Priority, Link 1: 1 Link Priority, Link 2: 2 Comment: Video (base stream) and audio data is transported over one link, incremental redundancy video data is transported over a second link. If the second link breaks, the user suffers a reduction in QoS, but the video is not interrupted. If the first link fails, the video/audio stream stops. |
| Configuration 3: Three communication links operated simultaneously | Link Priority, Link 1: 2 Link Priority, Link 2: 3 Link Priority, Link 3: 1 Comment: video (base stream) is transported over one link, incremental redundancy video data is transported over a second link and audio data is transported over a third link. |

In the example of configuration 3, the audio stream is for example considered to be the stream requiring the highest protection level since even in case that the video stream fails, the user will be able to enjoy Audio only. Therefore, the fact that the third radio link has the highest priority in this example indicates that audio would be transmitted over link 3 according to configuration 3. Similarly, the information about the link priorities indicates that the incremental redundancy video data (being the least important) would be transmitted over link 2 and that the video base layer would be transmitted over link 1 according to configuration 3.

Sub-entity 405 for information provision on supported IP sub-nets: Many cellular operators do not provide public IP addresses to mobile devices. A mobile device may be part of a private IP sub-net within the operator network. Such a configuration typically allows for a "pull" type of information flow (i.e. the mobile device requests information from a distant server), but not for a "push" type of information flow (i.e. a device external to the IP sub-net cannot directly address the concerned mobile device since the sub-net IP address of the mobile device is not available to external entities).

Figure 5:
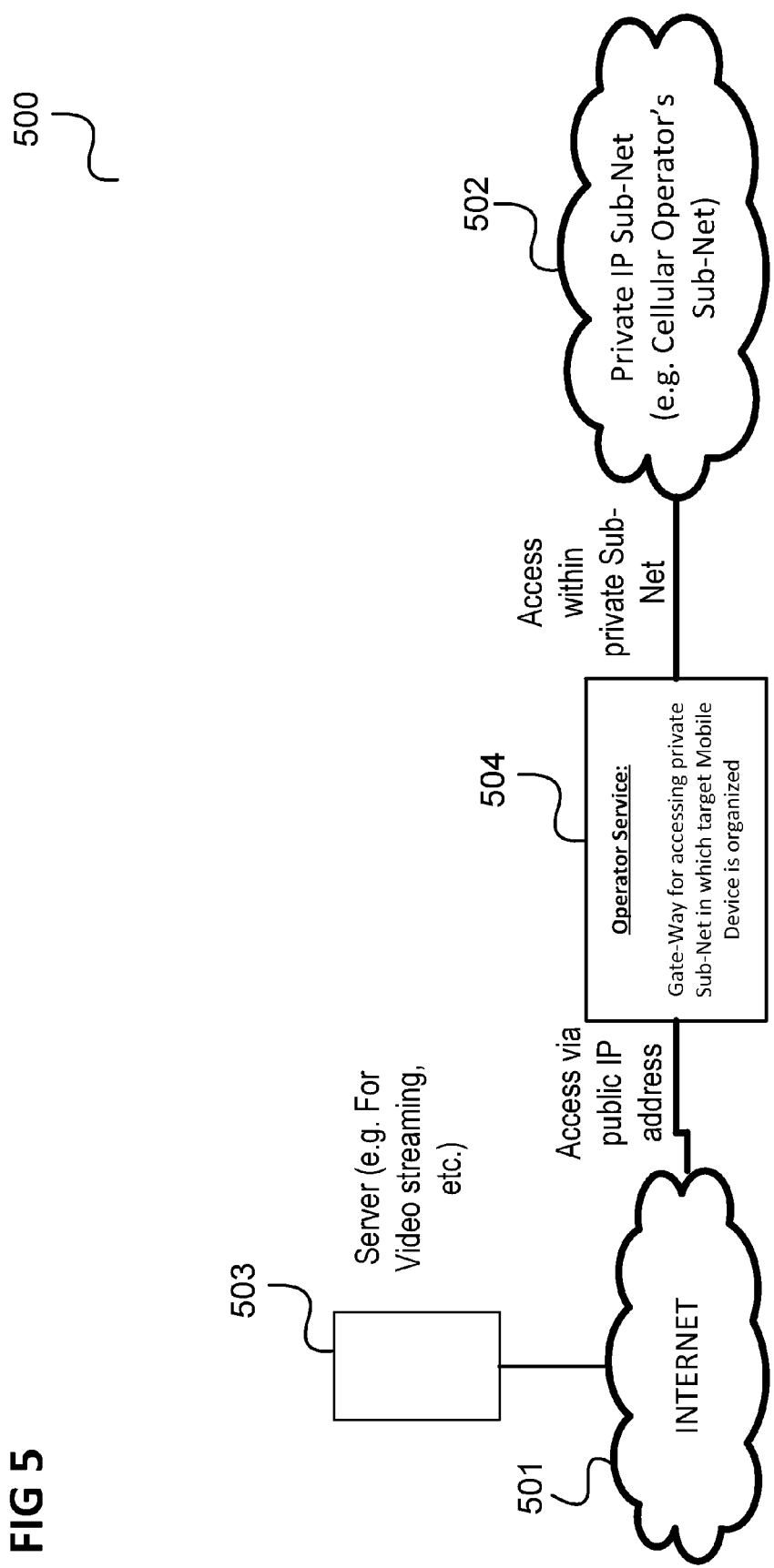
FIG. 5 shows a communication arrangement including a gateway arranged between a private IP sub-net and the Internet.

The second sub-entity 405 may for example provide a service to allow streaming services into such a private IP sub-net as it is illustrated in FIG. 5.

FIG. 5 shows a communication arrangement 500.

The communication arrangement includes the Internet 501 and a private IP sub-net (e.g. a sub-net of an operator of a radio communication network providing one of the radio links 107) 502. The Internet 501 and the private IP sub-net 502 for example correspond to the IP networks 108, wherein in this example the mobile device 106 accesses the Internet 501 via the private IP sub-net 502. The communication arrangement 500 further includes a server 503 connected to the Internet for example corresponding to the server 109 and the server 402. The private IP sub-net 502 is connected to the Internet 501 via a gateway 504 which may be accessed by a public IP address from the Internet side.

The communication arrangement includes a service for accessing the private sub-net 502.

This service eliminates the need for using protocols like STUN (Session Traversal Utilities for NAT), since the operator is fully aware of the applied network settings. Instead of communicating with a public STUN server in order to determine its external IP and port, the mobile device 106 may inform this "Operator Service" (i.e. a corresponding entity providing this service such as the gateway 504) that it needs to receive an incoming data stream from an external device, providing specific details on the IP and the port of that device, as well as its own port where it expects the communication. If the entity providing the "Operator Service" accepts the mobile device's request, it sends back information on the public IP and port that have to be reported to the external device to establish the communication and makes the necessary arrangements to the network routing and protection service. Then the mobile device requests the data stream from the external device (i.e. the server 503 in this example) and when the incoming stream arrives it is recognized and it is routed (e.g. by the gateway 504) to the correct internal IP and port, namely the one of the mobile device.

It should be noted that radio network operators typically do not use a single private IP sub-net but multiple ones. This means that two mobile devices connecting via 3GPP UMTS/LTE/etc. are not necessarily in the same private IP sub-net, but most likely in independent ones. In such a case, the mobile devices can not directly route traffic from one to another.

The gateway 504 provides a service for accessing the private sub-net 502. The mobile device 106 for example communicates with the second sub-entity 405 in the context of the operator service provide by the gateway 504 as follows.

Figure 6:
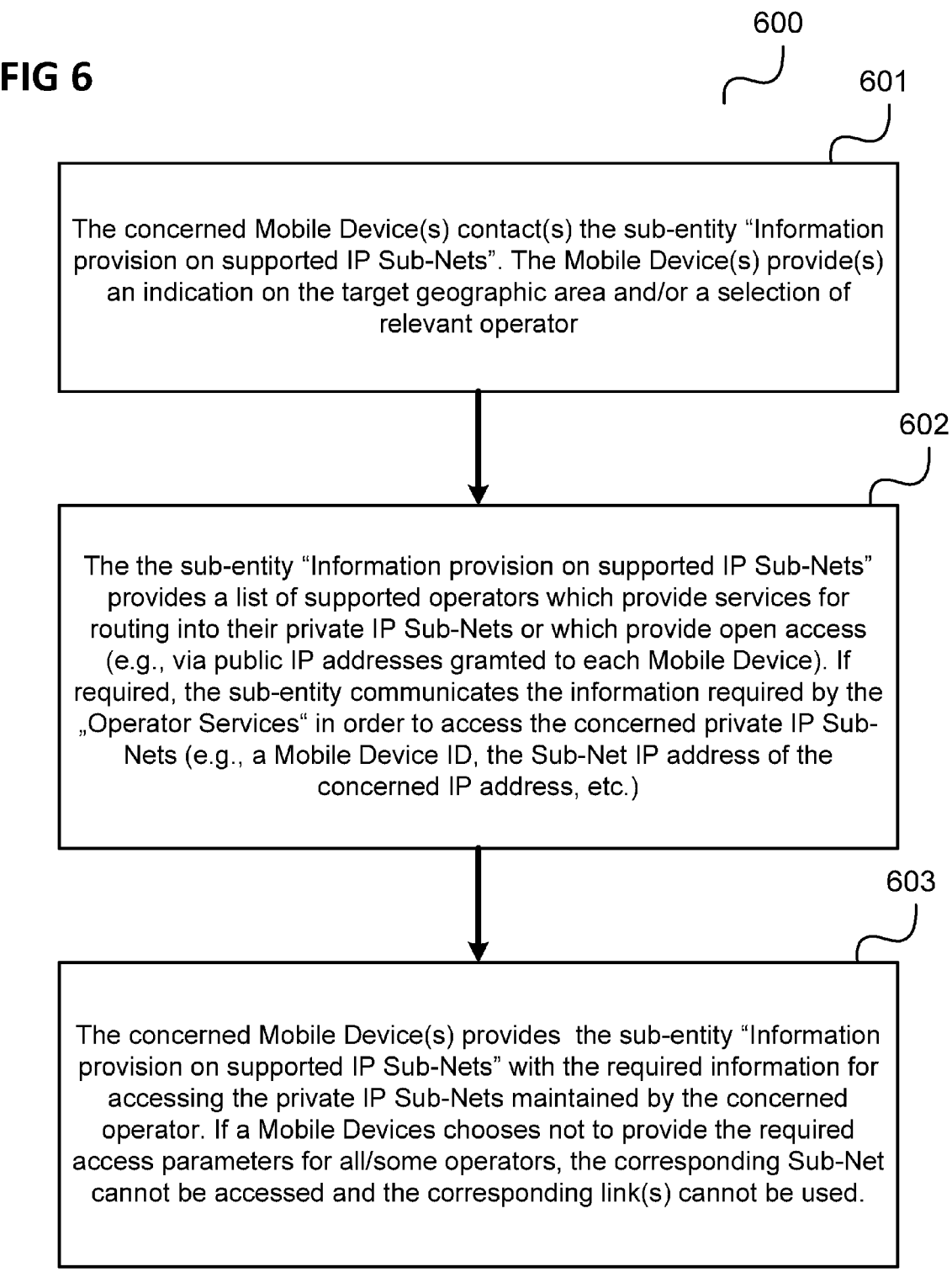
FIG. 6 shows a flow diagram illustrating an interaction for information provision on IP sub-nets.

FIG. 6 shows a flow diagram 600.

In 601, the mobile device 106 contacts the second sub-entity 405. The mobile device provides an indication on the target geographic area where it wants to use the service provided by the server 503 (e.g., Germany, US, etc.) and/or a selection of the relevant operator (e.g., T-Mobile Germany, Vodaphone Germany, etc.) providing communication links in the target geographic area.

In 602, The second sub-entity 404 provides a list of supported operators which provide services for routing into their private IP sub-nets or which provide open access (e.g., via public IP addresses granted to each mobile device). If required, the second sub-entity 404 communicates the information required by the operator service (e.g. required by the gateway 504) in order to access the concerned private IP sub-nets (e.g., a mobile device ID, the sub-net IP address of the concerned IP address, etc.).

In 603, the mobile device 106 provides the sub-entity "Information provision on supported IP sub-nets" with the required information for accessing the private IP sub-nets maintained by the concerned operator (e.g. the IP sub-net 502). If the mobile device 106 chooses not to provide the required access parameters for all/some operators, the corresponding sub-net cannot be accessed and the corresponding link(s) (i.e. the communication links using this sub-net) cannot be used.

Sub-entity 406 for buffering predefined mobile device configurations:

The third sub-entity 406 stores a plurality of pre-defined configurations for transmitting data to the mobile device 106.

For example, the mobile device 106 indicates a number of sets of IP addresses (or details on private IP sub-nets if required) to the third sub-entity 406 which may be used for the service provided by the server 109, e.g. to transmit data to the mobile device 106. In other words, a pre-defined configuration may correspond to a set of IP addresses of the mobile device 106 corresponding to IP connections to be used for transmitting data to the mobile device 106 according to this configuration.

In case that a handover needs to be performed the following may be carried out:

The mobile device 106 triggers to change to another one of the pre-defined configurations or The network/server (i.e. the server 109 or another, e.g. intermediate, network component handling data transmission to the mobile device 106) is allowed to autonomously select one of the pre-defined configurations.

In case that no trigger from the mobile device 106 arrives at the network component/server within a given timeframe, the network component/server is allowed to autonomously select one of the pre-defined configurations.

As an example corresponding to the example of table 2, the pre-defined sets of IP addresses provided by the mobile device 106 is for example communicated in a format as by table 3.

TABLE 3

Example of pre-defined sets of links provided by the mobile device

| | |
|---|---|
| Configuration 1: One single link | Predefined link set 1: IP address "IP-A1" (within a private sub-net of Operator "xyz", corresponds for example to 3GPP LTE) Predefined link set 2: IP address "IP-A2" (public IP address, corresponds for example to WLAN) Predefined link set 3: IP address "IP-A3" (public IP address, corresponds for example to IEEE 802.11af, i.e. WIFI for TVWS) Comment: All video and audio data is |

TABLE 3-continued

Example of pre-defined sets of links provided by the mobile device

| | |
|---|---|
| | transported over a single link. If the link fails, the video/audio stream stops. |
| Configuration 2: Two links operated simultaneously | Predefined link set 1: IP address "IP-B1" for Link 1 (within a private sub-net of Operator "xyz", corresponds for example to 3GPP LTE), IP address "IP-B2" for Link 2 (corresponds for example to WLAN), Predefined link set 1: IP address "IP-B3" for Link 1 (within a private sub-net of Operator "xyz", corresponds for example to 3GPP LTE), IP address "IP-B4" for Link 2 (corresponds for example to IEEE 802.11af, i.e. WiFi for TVWS) Comment: Video (base stream) and audio data is transported over one link, incremental redundancy video data is transported over a second link. If the second link breaks, the user suffers a reduction in QoS, but the video is not interrupted. If the first link fails, the video/audio stream stops. |
| Configuration 3: Three links operated simultaneously | Predefined link set 1: IP address "IP-C1" for Link 3 (within a private sub-net of Operator "xyz", corresponds for example to 3GPP LTE), IP address "IP-C2" for Link 1 (corresponds for example to WLAN), "IP-C3" for Link 2 (corresponds for example to IEEE 802.11af, i.e. WiFi for TVWS) Comment: Video (base stream) is transported over one link, incremental redundancy video data is transported over a second link and audio data is transported over a third link. |

By providing the sets of IP addresses, e.g. as in table 3, the mobile device 106 can also take hardware constraints into account. For example, the simultaneous operation of some RATs may not be possible in a mobile device 106. Those configurations can be excluded by the mobile device 106 when communicating the sets of IP addresses to the third sub-entity 406.

Figure 7:
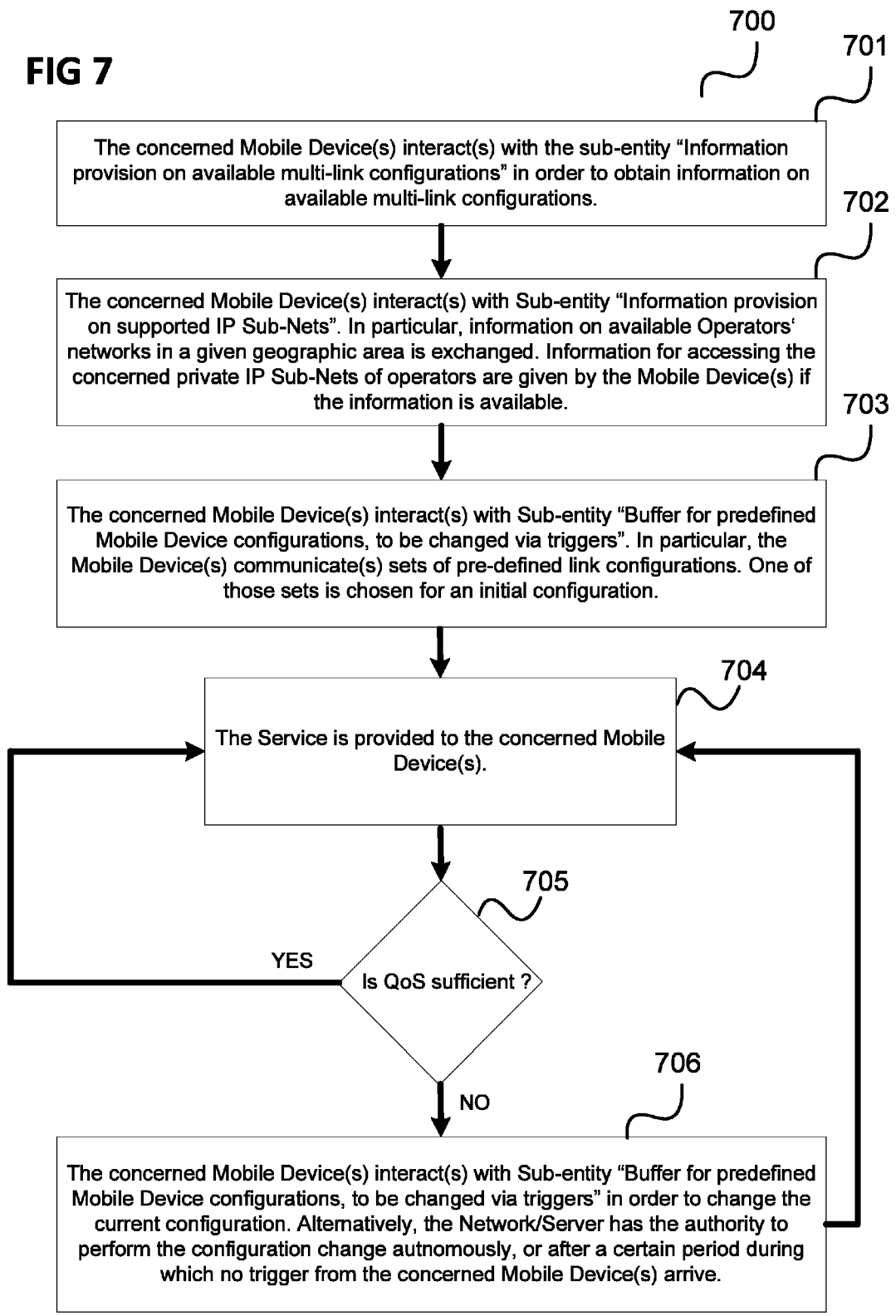
FIG. 7 shows a flow diagram illustrating mobile device centric link selection.

Based on the sub-entities 404, 405, 406 the set-up and management of a multi-RAT based service access with mobile device centric decision making is for example performed as illustrated in FIG. 7.

FIG. 7 shows a flow diagram 700.

In 701, the mobile device 106 interacts with the first sub-entity 404 in order to obtain information on available multi-link configurations.

In 702, the mobile device 106 interacts with the second sub-entity 405. Information on available operators' networks in a given geographic area is exchanged. Information for accessing the concerned private IP sub-nets of operators is given by the mobile device 106 if the information is available.

In 703, the mobile device 106 interacts with the third sub-entity 406. In particular, the mobile device 106 communicates sets of pre-defined link configurations. One of those sets is chosen for an initial configuration.

In 704, the server 109 provides the service to the mobile device 106.

In 705, the mobile device 106 (or another entity) checks whether the QoS at which the service is provided is sufficient. If yes, the server 109 continues to provide the service in 704. For example, 705 is carried out periodically.

If the QoS at which the service is provided is not sufficient, the mobile device 106, in 706, interacts with the third sub-entity 406 in order to change the current configuration. Alternatively, the network/server has the authority to perform the configuration change autonomously, or after a certain period during which no trigger from the concerned mobile device 106 arrives. The server 109 then continues to provide the service with the changed configuration in 704

Network/Server Centric Decision Making for Selected a Multitude of Heterogeneous RATs to be Operated Simultaneously for Accessing a Single Service For network/server centric decision making a multi-link management entity 403 may also be introduced as described above for mobile device centric decision making. For network/server centric decision making, the functionalities of the sub-entities 404, 405, 406 are for example adapted as follows.

Sub-entity 404 for Information provision on available multi-link configurations: The first sub-entity 404 on the network side stores a list of feasible configurations, e.g. indicating how many independent links can be supported for providing the concerned service requested by the mobile device 106 from the server 109. The mobile device 106 can request this information but does not have to since the final decision on the link selection is taken on the network/server side. However, the information may be used by the mobile device in order to only deliver the link information to the network/server that finally lead to feasible configurations. Also, it helps the mobile device 106 (or its user) to better understand the behavior of the network/server centric decision making processes in case that the current link situation makes the QoS drop and a reconfiguration is required.

Sub-entity 405 for information provision on supported IP sub-nets: The second sub-entity 405 is used by the network/server in order to identify the feasible connections through private IP sub-nets. The network/server requests location information from the mobile device 106 or take the information from the network (for example, information on a base station location may be sufficient if the mobile device 106 is connected to this base station). Then, the network/server requests corresponding access information from the mobile device 106. This information can be expected to be required by the relevant operators in order to grant access to the concerned private IP sub-nets.

Sub-entity 406 for buffering predefined mobile device configurations: The third sub-entity 406 is for example used in case that the mobile device 106 (or its user) prefers to communicate preferred multi-RAT link configurations in case of a link reconfiguration. The triggers for a reconfiguration change are however for example initiated by the network/server and communicated to the mobile device 106, forcing a reconfiguration.

Figure 8:
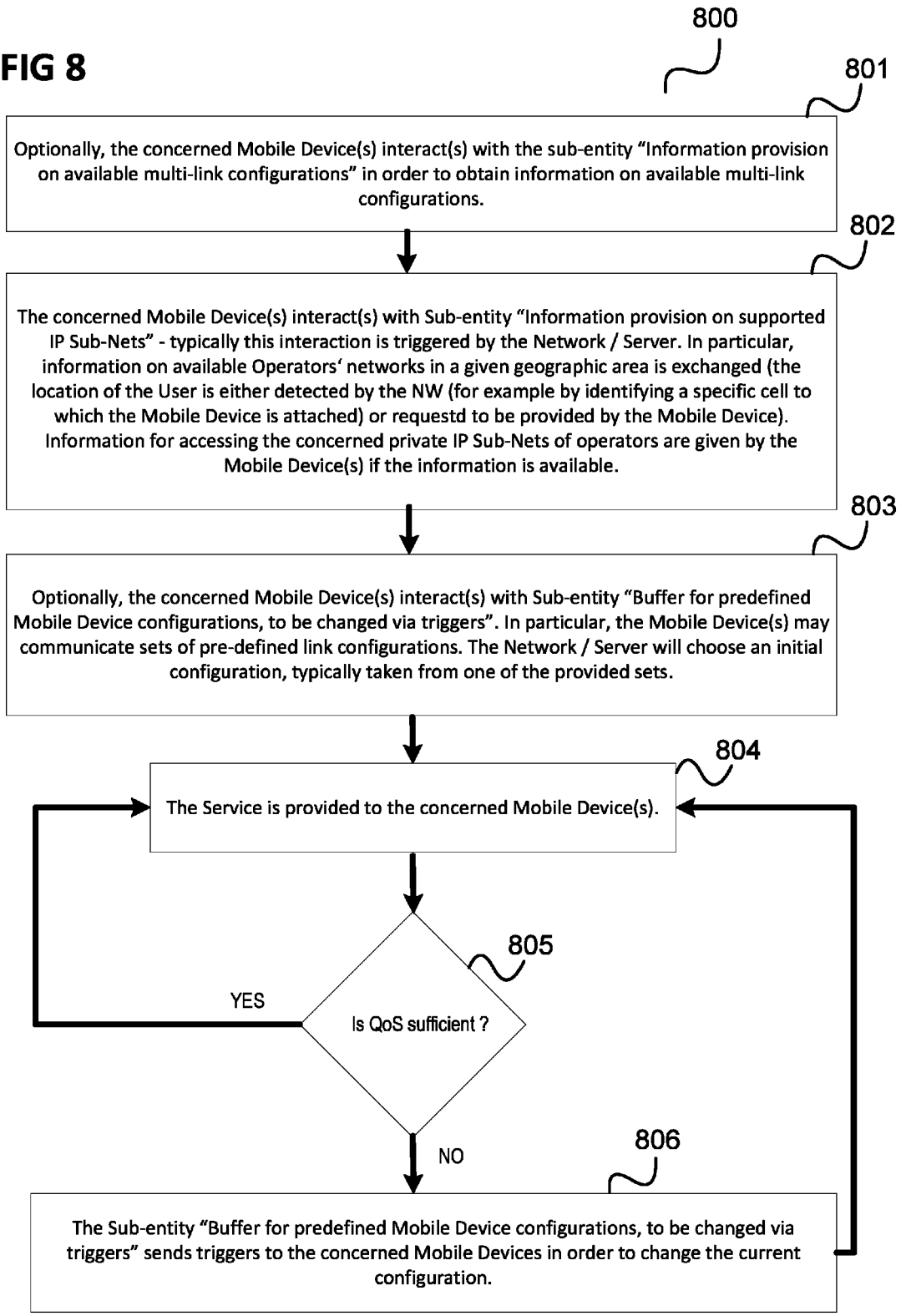
FIG. 8 shows a flow diagram illustrating network/server centric link selection.

Based on the sub-entities 404, 405, 406 the set-up and management of a multi-RAT based service access with network/server centric decision making is for example performed as illustrated in FIG. 8.

FIG. 8 shows a flow diagram 800.

In 801, the mobile device 106 optionally interacts with the first sub-entity 404 in order to obtain information on available multi-link configurations.

In 802, the mobile device 106 interacts with the second sub-entity 405. This interaction is for example triggered by the network/server. For example, information on available operators' networks in a given geographic area is exchanged. The location of the mobile device 106 is for example either detected by the network, i.e. by a component of the network side, for example by identifying a specific cell to which the mobile device 106 is attached, or requested to be provided by the mobile device 106. Information for accessing the concerned private IP sub-nets of operators are given by the mobile device 106 if the information is available.

In 803, the mobile device 106 optionally interacts with the third sub-entity 406. For example, the mobile device 106 may communicate sets of pre-defined link configurations. The network/server chooses an initial configuration, e.g. taken from one of the provided sets.

In 804, the server 109 provides the service to the mobile device 106.

In 805, the mobile device 106 (or another entity) checks whether the QoS at which the service is provided is sufficient. If yes, the server 109 continues to provide the service in 804. For example, 805 is carried out periodically.

If the QoS at which the service is provided is not sufficient, the third sub-entity 406 sends triggers to the mobile device 106 in order to change the current configuration and the server 109 continues to provide the service with the changed configuration in 804.

In the following, it is discussed how the mobile device 106 may learn how to receive the various desired parts of the data provided by the server 109, e.g. which parts of the data are sent via which radio link.

It is assumed that the splitting of the data provided by the server 109 (e.g. a multimedia resource) that the client has requested has already been done on the network/server side. The issue after the splitting is how the client (i.e. the mobile device 106) learns about how to receive the desired pieces of the data.

The network/server for example communicates to the mobile device 106 the characteristics of each part of the data, as well as for example, for each part of the data, the IP address/port by means of which the part of the data is communicated. At this point the client may inform the network/server about the existence of its other interfaces (i.e. supported communication links) as well (e.g. indicating their public addresses). In that case the network/server may send back information on alternative IP/ports where the same resource pieces are available, i.e. by means of which the part of the data is communicated. Some of these alternative communication links may for example use the same subnet as the mobile device 106. Identifying subnets is of course also an issue, but it can be done based on the public IP.

Figure 9:
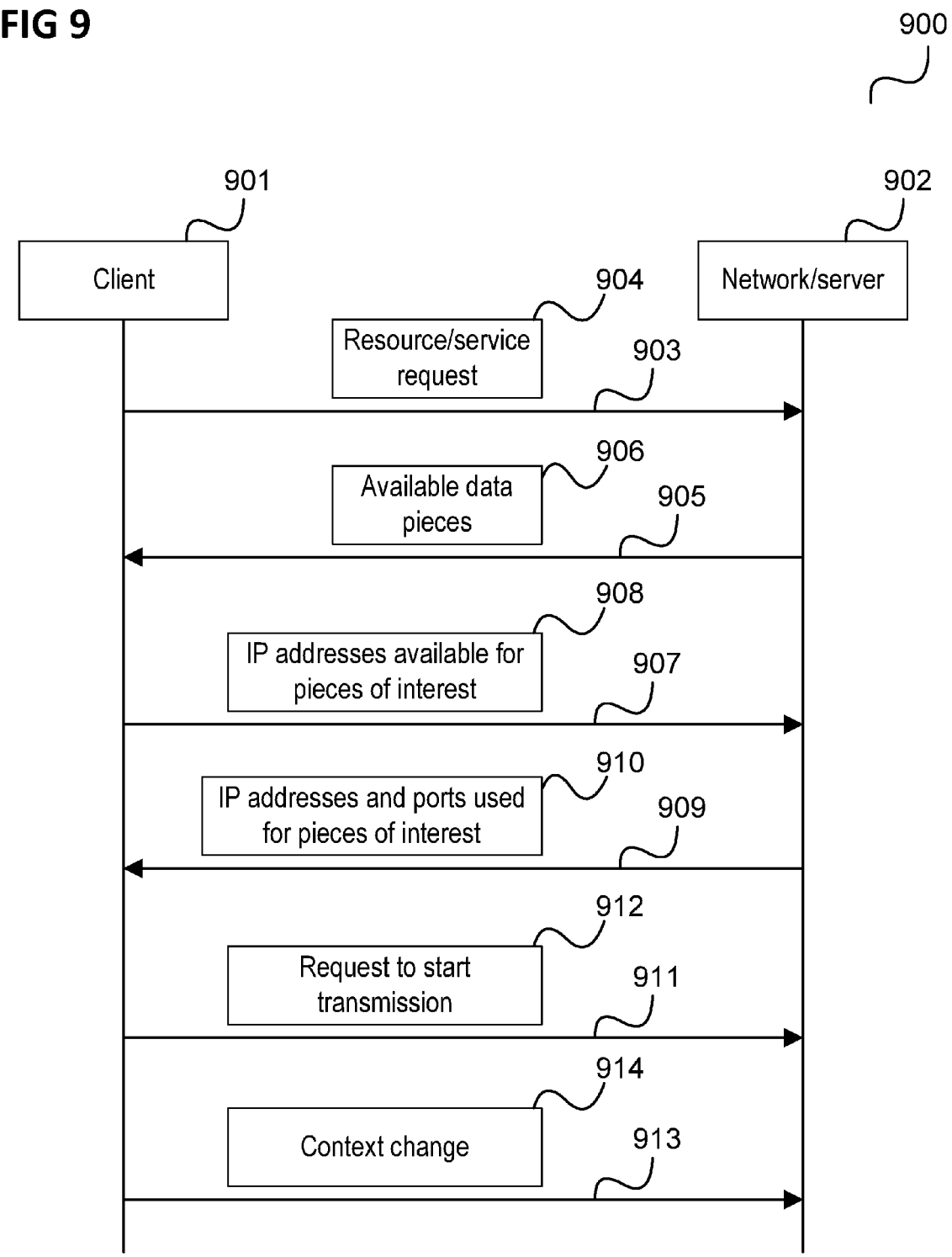
FIG. 9 shows a message flow diagram illustrating the setting up of a transmission of service data using a plurality of communication links.

For the identifying the pieces of interest (i.e. parts of the data) to the client (e.g. just the base quality stream of an Audio Stream, not the incremental redundancy streams, etc.) the protocol as illustrated in FIG. 9 is for example used.

FIG. 9 shows a message flow diagram 900.

The message flow takes place between a client 901, e.g. corresponding to the mobile device 106 and the network or server (e.g. a plurality of network components, e.g. including the server 109 and the multi-link management entity 403 or any of its sub-entities 404, 405, 406 or any other network component, e.g. an intermediate network component handling the data transfer between the server 109 and the mobile device 106).

Figure 10:
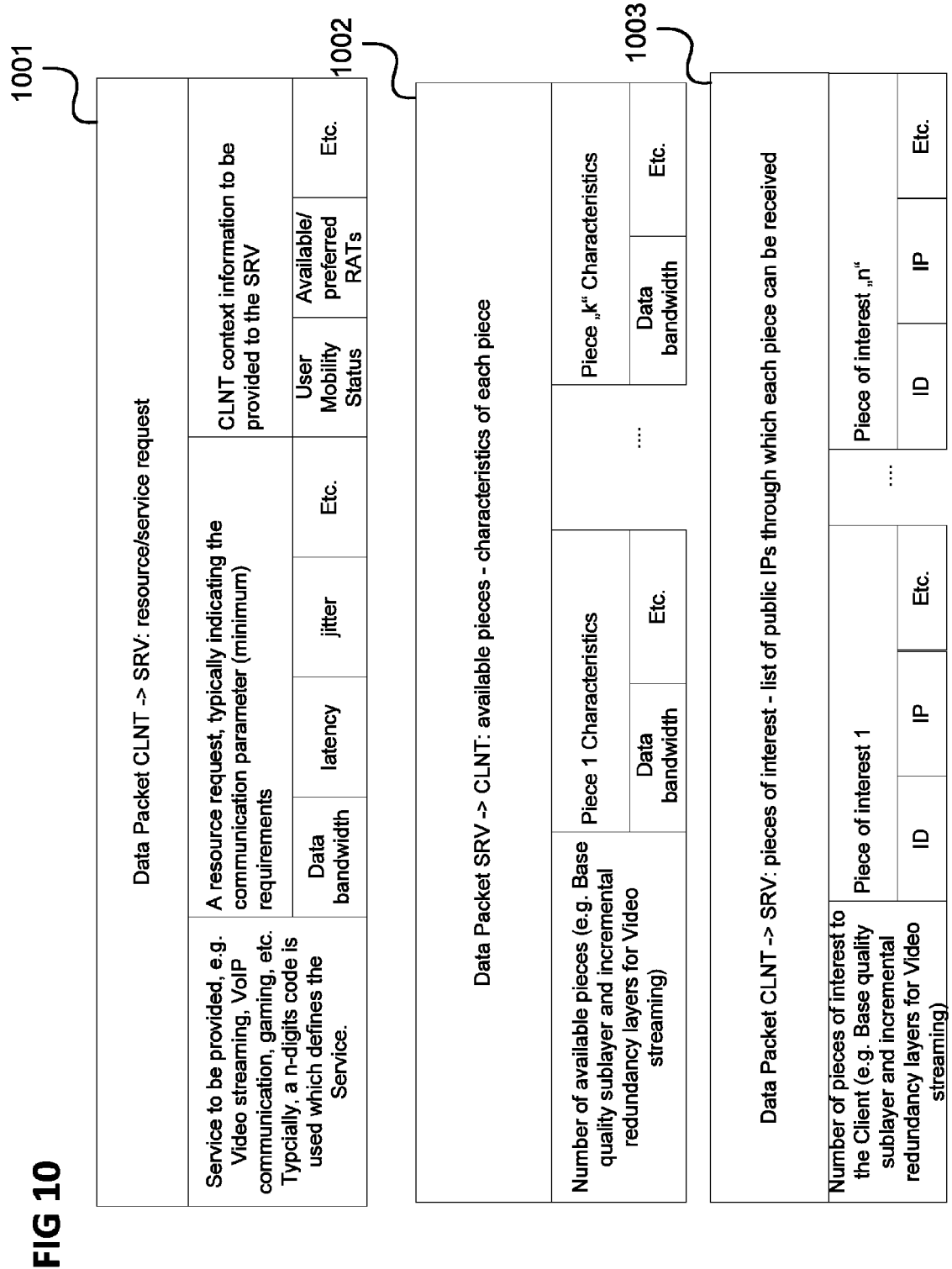
FIG. 10 and FIG. 11 show examples for the messages exchanged according to the message flow diagram shown in FIG. 9.
Figure 11:
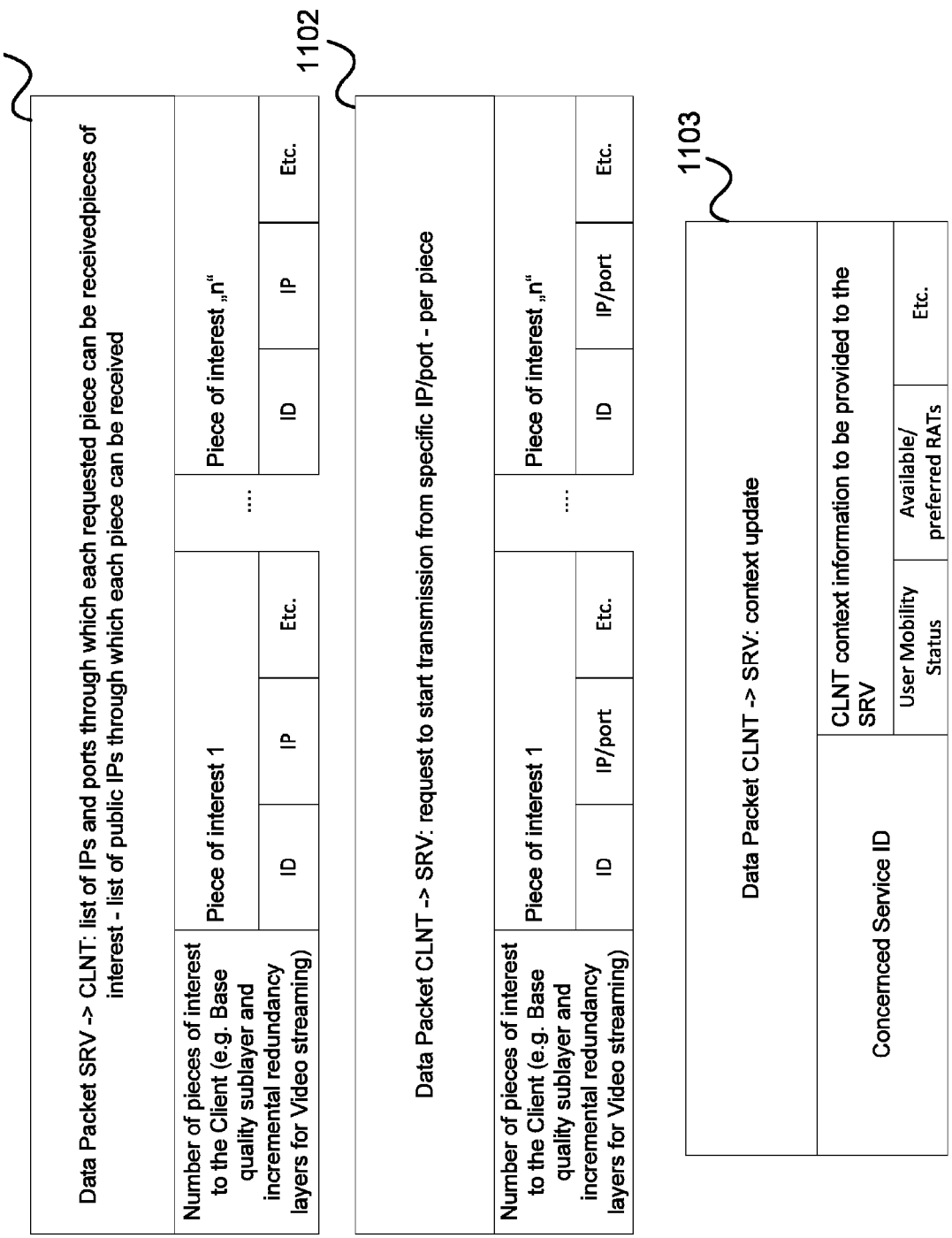

FIG. 10 and FIG. 11 show examples for the messages exchanged according to the message flow diagram 900.

In 903, the client 901 transmits a first message 904 to the network/server, e.g. to a network entity, for example, the first sub-entity 404.

The first message 904 is a resource/service request which for example relates to A service to be provided, e.g. video streaming, VoIP communication, gaming, etc. The first message 904 can include a service quality level, e.g. a video quality levels, etc.

A resource request, e.g. indicating the communication parameter (minimum) requirements such as i) data bandwidth, ii) latency, iii) jitter, iv) packet loss probability, etc.

Client context information can be provided to the network/server 902 in order to support it in the RAT selection process. This context information can also be used in order to request a specific set of RATs.

An example for the first message 904 is the message 1001 shown in FIG. 10.

In 905, the network/server 902 informs the client 901 about the available pieces of data and the characteristics of each piece of data with a second message 906.

An example for the second message 906 is the message 1002 shown in FIG. 10.

In 907, the client 901 informs the network/server 902 by means of a third message 908 about the pieces of interest for the client 901 and gives, for each piece of interest (e.g. audio, base layer of a video, enhancement layer of a video), a public IP address by means of which the piece of interest can be transmitted to the client 901.

An example for the third message 908 is the message 1003 shown in FIG. 10.

In 909, the network/server 902 informs the client 901 about the IP addresses and ports used for transmitting the pieces of interest by means of a fourth message 910. The network/server 902 may have identified that an interface of the client 901 and a resource point are on the same subnet (e.g. both have public Ws known to belong to the same 3G Operator). In that case the server could send to the client the local IP/port of the resource point as well, resolving connectivity issues because of firewalls and NATs.

An example for the fourth message 910 is the message 1101 shown in FIG. 11.

In 911, the client requests to start transmission of the pieces of interest using a specific IP address and port per piece by sending a fifth message 912 to the network/server 902. The transmission may thus be controlled by the client, i.e. the server has sent all the necessary information and the client decides which pieces of data should be communicated over which communication link. In response of the request, the network/server 902 starts providing the requested data to the client 901.

An example for the fifth message 912 is the message 1102 shown in FIG. 11.

In this example, the client 901 changes the client context in 913 by means of a sixth message 914.

Such a client context change may trigger the re-negotiation of the service parameters, i.e. a change of the communication links used (including e.g. a change of the IP addresses and ports used). Some or all of 903, 905, 907, 911 may be carried out perform this adaptation of the service parameters.

An example for the sixth message 914 is the message 1103 shown in FIG. 11.

It should be noted that the pieces of data or parts of the data that the mobile device 106 requests and that are provided according to the service provided by the server 109 are not necessarily sub-streams of a stream (e.g. an audio stream or a base layer or an enhancement layer of a video stream). In contrast, the server 109 may for example provide a file and the parts of the data are parts of the file.

Further, the splitting of a file or stream may happen at a lower layers than the application layer (e.g. at a lower layer than the layer of the codec as in case of the parts of data being an audio stream and a base layer and an enhancement layer of a video stream). For example, an entity at the network layer may receive a file or stream and separates it into sub-files or sub-stream, e.g. cyclically distributes consecutive parts (e.g. parts of data corresponding to one or more frames) to the different communication links to be used for the transmission.

Figure 12:
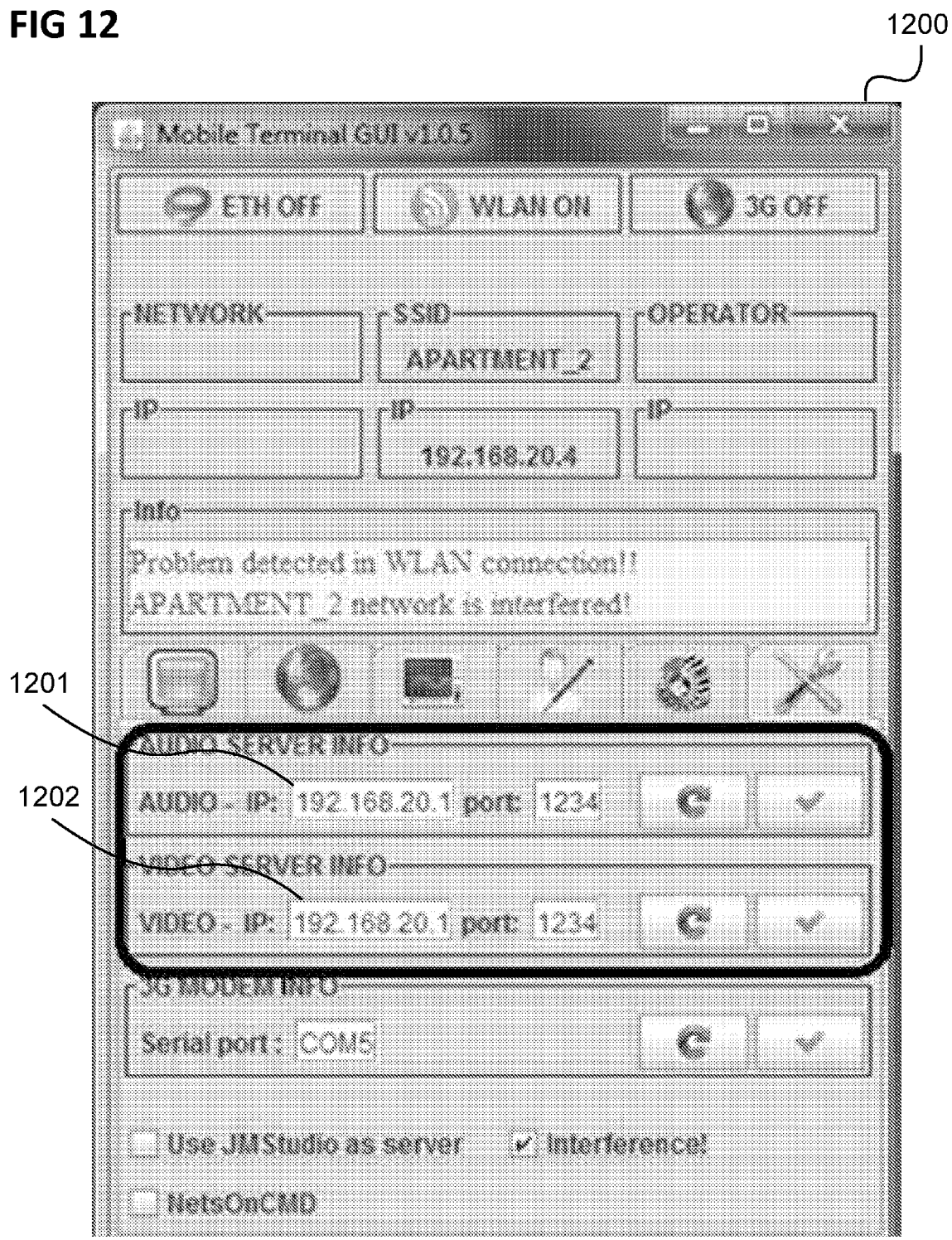
FIG. 12 shows an example for a web-Interface for adding a number of IP links to be used for provision of service data.

FIG. 12 shows an example for a web-Interface for adding a number of IP links to be used simultaneously in order to provide a single service which is split over a number of independent communication links.

In this example, the user may enter an IP address in a first IP address field 1201 corresponding to a first communication link over which audio data is to be transmitted to the client 106.

In a second IP address field 1202, the user may enter an IP address corresponding to a second communication link over which video data is to be transmitted to the client 106.

By means of a web interface as for example shown in FIG. 12, a user of a web-based service, in this example video streaming, may enter a number of IP addresses to be used simultaneously for an efficient split of the service.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A communication controller comprising:
   a determiner circuit to determine, for each communication connection of a set of communication connections between a communication device and another communication device, priorities of the communication connections based on a network policy provided to the communication controller from a network, the network policy to provide an indication of a preferred usage of one or more radio access technologies (RATs) associated with the set of communication connections;
   a selector circuit to select a plurality of the communication connections based on the priorities of the communication connections, the selected plurality of communication connections associated with a respective plurality of RATs; and
   a controller circuit to control a transmission of data between the communication device and the other communication device to use the selected plurality of communication connections, wherein said control of the transmission is to provide simultaneous data transmission over the selected plurality of communication connections,
   wherein the communication device is a communication terminal located in an IP subnet and the communication controller is to determine a port and an IP address for reaching the communication terminal via the communication connections.

2. The communication controller of claim 1, wherein the determiner circuit is to determine a plurality of characteristics of the communication connections, the plurality of characteristics to include the priority of the communication connections.

3. The communication controller of claim 2, wherein the communication controller comprises a receiver to receive an indication of the plurality of characteristics of the communication connections.

4. The communication controller of claim 2, wherein the plurality of characteristics further include transmission quality via the communication connections, bandwidth of the communication connections, reliability of the communication connections, or cost of data transmission via the communication connections.

5. The communication controller of claim 1, further comprising a transmitter to transmit an indication of the selected communication connections to the communication device, the other communication device or both.

6. The communication controller of claim 1, wherein the communication device is a communication terminal and the other communication device is a component on a network side of a communication system.

7. The communication controller of claim 1, wherein the communication device is a subscriber terminal of a cellular radio communication network.

8. The communication controller of claim 1, wherein the other communication device is a network component of a cellular radio communication network.

9. The communication controller of claim 1, wherein the communication connections are network layer connections.

10. The communication controller of claim 1, wherein the communication connections are IP connections.

11. The communication controller of claim 1, further comprising a receiver to receive an indication of the set of communication connections.

12. The communication controller of claim 1, wherein the communication controller is part of the communication device or of the other communication device.

13. A communication controller comprising:
   a determiner circuit to determine, for each communication connection of a set of communication connections between a communication device and another communication device, priorities of the communication connections based on a network policy provided to the communication controller from a network, the network policy to provide an indication of a preferred usage of one or more radio access technologies (RATs) associated with the set of communication connections:
   a selector circuit to select a plurality of the communication connections based on the priorities of the communication connections, the selected plurality of communication connections associated with a respective plurality of RATs;
   a controller circuit to control a transmission of data between the communication device and the other communication device to use the selected plurality of communication connections, wherein said control of the transmission is to provide simultaneous data transmission over the selected plurality of communication connections; and
   a receiver to receive a port and an IP address for reaching a communication terminal via the communication connections from the communication terminal.

14. A communication controller comprising:
   a determiner circuit to determine, for each communication connection of a set of communication connections between a communication device and another communication device, priorities of the communication connections based on a network policy provided to the communication controller from a network, the network policy to provide an indication of a preferred usage of one or more radio access technologies (RATs) associated with the set of communication connections:
a selector circuit to select a plurality of the communication connections based on the priorities of the communication connections, the selected plurality of communication connections associated with a respective plurality of RATs; and
a controller circuit to control a transmission of data between the communication device and the other communication device to use the selected plurality of communication connections, wherein said control of the transmission is to provide simultaneous data transmission over the selected plurality of communication connections,
wherein the transmission of data is transmission of a file.

15. The communication controller of claim 14, wherein the communication controller is to initiate splitting of the file in a part for each communication connection of the selected communication connections and control the transmission to transmit the parts over the set of communication connections.

16. The communication controller of claim 15, wherein the communication controller is to initiate the splitting of the file at a network layer.

17. A communication controller comprising:
a determiner circuit to determine, for each communication connection of a set of communication connections between a communication device and another communication device, priorities of the communication connections based on a network policy provided to the communication controller from a network, the network policy to provide an indication of a preferred usage of one or more radio access technologies (RATs) associated with the set of communication connections:
a selector circuit to select a plurality of the communication connections based on the priorities of the communication connections, the selected plurality of communication connections associated with a respective plurality of RATs:
a controller circuit to control a transmission of data between the communication device and the other communication device to use the selected plurality of communication connections, wherein said control of the transmission is to provide simultaneous data transmission over the selected plurality of communication connections; and
a receiver to receive an indication of the set of communication connections,
wherein the indication of the set of communication connections is a set of IP addresses.

18. An apparatus comprising:
means for determining, for each communication connection of a set of communication connections between a communication device and another communication device, a priority of the communication connection based on a network policy provided to a communication controller from a network, the network policy to provide an indication of a preferred usage of one or more radio access technologies (RATs) associated with the set of communication connections;
means for selecting a plurality of the communication connections based on the priorities of the communication connections, the selected plurality of communication connections associated with a respective plurality of RATs; and
means for controlling transmission of data between the communication device and the other communication device to use the selected plurality of communication connections,
wherein the transmission of data is transmission of a file.

19. The apparatus of claim 18, further comprising means for transmitting an indication of the selected communication connections to the other communication device.

20. The apparatus of claim 18, further comprising means for receiving an indication of the set of communication connections.

21. The apparatus of claim 20, wherein the indication of the set of communication connections is a set of IP addresses.

* * * * *